US011132676B2

(12) United States Patent
Xia et al.

(10) Patent No.: US 11,132,676 B2
(45) Date of Patent: Sep. 28, 2021

(54) PARALLEL EXECUTION OF TRANSACTIONS IN A BLOCKCHAIN NETWORK

(71) Applicant: Advanced New Technologies Co., Ltd., Grand Cayman (KY)

(72) Inventors: Ning Xia, Hangzhou (CN); Guilu Xie, Hangzhou (CN); Fuxi Deng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/421,995

(22) Filed: May 24, 2019

(65) Prior Publication Data

US 2019/0287101 A1 Sep. 19, 2019

Related U.S. Application Data

(63) Continuation of application No. PCT/CN2018/124814, filed on Dec. 28, 2018.

(51) Int. Cl.
*G06Q 20/00* (2012.01)
*G06Q 20/38* (2012.01)
(Continued)

(52) U.S. Cl.
CPC .......... *G06Q 20/389* (2013.01); *G06F 9/466* (2013.01); *G06Q 20/223* (2013.01); *H04L 9/00* (2013.01); *H04L 63/0428* (2013.01)

(58) Field of Classification Search
USPC .................................................. 705/35, 44
See application file for complete search history.

(56) References Cited

U.S. PATENT DOCUMENTS 9,558,465 B1 1/2017 Arguelles et al.
10,417,217 B2 9/2019 Pierce et al.
(Continued)

FOREIGN PATENT DOCUMENTS

CN 106878000 6/2017
CN 106934710 7/2017
(Continued)

OTHER PUBLICATIONS

The Truth about Blockchain (Harvard Business review) (Year: 2017).*

(Continued)

*Primary Examiner* — Bruce I Ebersman
(74) *Attorney, Agent, or Firm* — Fish & Richardson P.C.

(57) ABSTRACT

Implementations of this specification include identify a plurality of transactions to be executed in the blockchain, wherein the transactions are arranged in an execution order, and wherein the execution order includes a contract call arranged after the plurality of transactions; identify groups of transactions within the plurality of transactions, wherein each transaction in each group is associated with a same account in the blockchain network as the other transactions in the group; instruct nodes of the blockchain network to execute each of the groups of transactions in parallel, wherein executing each group of transactions includes executing the transactions within the group serially and according to the execution order; determine that the nodes of the blockchain network have completed executing all of the groups of transactions; and in response, instruct the nodes of the blockchain network to execute the contract call.

14 Claims, 6 Drawing Sheets

(51) Int. Cl.
  *G06F 9/46* (2006.01)
  *G06Q 20/22* (2012.01)
  *H04L 9/00* (2006.01)
  *H04L 29/06* (2006.01)

(56) References Cited

U.S. PATENT DOCUMENTS

| | | | |
|---|---|---|---|
| 10,425,399 B2* | 9/2019 | Kravitz | H04L 9/0836 |
| 10,489,597 B2 | 11/2019 | Safford et al. | |
| 10,616,324 B1 | 4/2020 | Kaddoura | |
| 10,652,239 B2 | 5/2020 | Jentzch et al. | |
| 2017/0212781 A1 | 7/2017 | Dillenberger et al. | |
| 2017/0300627 A1* | 10/2017 | Giordano | G16H 10/60 |
| 2018/0117446 A1* | 5/2018 | Tran | A63B 71/085 |
| 2018/0158034 A1 | 6/2018 | Hunt et al. | |
| 2018/0181714 A1* | 6/2018 | Pillarisetty | G16H 50/30 |
| 2018/0287780 A1* | 10/2018 | Safford | G06F 21/51 |
| 2018/0374062 A1* | 12/2018 | Hunter | G06Q 20/027 |
| 2018/0374086 A1 | 12/2018 | Ardashev et al. | |
| 2019/0034892 A1* | 1/2019 | Smith | H04L 9/3239 |
| 2019/0044714 A1* | 2/2019 | Parker | H04L 9/3239 |
| 2019/0065764 A1* | 2/2019 | Wood | G06F 21/6209 |
| 2019/0087793 A1* | 3/2019 | Dickerson | G06Q 20/0658 |
| 2019/0164151 A1* | 5/2019 | Doney | G06Q 20/3821 |
| 2019/0222578 A1 | 7/2019 | Nagao et al. | |
| 2019/0281065 A1 | 9/2019 | Xia et al. | |
| 2021/0160245 A1 | 5/2021 | Xia et al. | |

FOREIGN PATENT DOCUMENTS

| | | |
|---|---|---|
| CN | 106981004 | 7/2017 |
| CN | 107678865 | 2/2018 |
| CN | 107688999 | 2/2018 |
| CN | 107704269 | 2/2018 |
| CN | 108269072 | 7/2018 |
| CN | 108681565 | 10/2018 |
| CN | 108846659 | 11/2018 |
| CN | 108848119 | 11/2018 |
| CN | 109064171 | 12/2018 |
| EP | 3571653 | 11/2019 |
| RU | 2390838 | 5/2010 |
| RU | 181439 | 7/2018 |
| RU | 2673399 | 11/2018 |
| WO | WO 2017066002 | 4/2017 |
| WO | WO 2017083565 | 5/2017 |
| WO | WO 2018006056 | 1/2018 |
| WO | WO 2018031551 | 2/2018 |
| WO | WO 2018126059 | 7/2018 |
| WO | WO 2018157778 | 9/2018 |
| WO | WO 2018207064 | 11/2018 |
| WO | WO 2019072303 | 4/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2018/124814, dated Oct. 9, 2019, 8 pages.

U.S. Appl. No. 16/422,192, filed May 24, 2019, Xia et al.

aelf.io [online], "aelf—A Multi-Chain Parallel Computing Blockchain Framework," Jun. 2018, retrieved on Feb. 14, 2020, retrieved from URL<https://aelf.io/gridcn/aelf_whitepaper_EN.pdf?v=1.6>, 34 pages.

Borda, tokensoft.io [online], "Restricting Who Can Hold and Trade Your Security Tokens with ERC-1404 and Whitelishting," Nov. 2018, retrieved on Feb. 14, 2020, retrieved from URL<https://www.tokensoft.io/post/restricting-who-can-hold-and-trade-your-security-tokens-with-erc-1404-and-whitelisting>, 4 pages.

Extended European Search Report in European Application No. 18865725.8, dated Feb. 14, 2020, 9 pages.

Extended European Search Report in European Application No. 18867006.1, dated Mar. 6, 2020, 8 pages.

PCT International Search Report and Written Opinion in International Application No. PCT/CN2018/124873, dated Sep. 26, 2019, 8 pages.

Xu et al., "A Pattern Collection for Blockchain-based Applications," Pattern Languages of Programs, Jul. 2018, pp. 1-20.

Apostolaki et al, "Sabre: Protecting Bitcoin against Routing Attacks," Network and Distributed Systems Security (NDSS) Symposium, Feb. 2019, 15 pages.

\* cited by examiner

PARALLEL EXECUTION OF TRANSACTIONS IN A BLOCKCHAIN NETWORK

CROSS-REFERENCE TO RELATED APPLICATIONS

This application is a continuation of PCT Application No. PCT/CN2018/124814, filed on Dec. 28, 2018, which is hereby incorporated by reference in its entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

One issue encountered in blockchain networks is the speed at which transactions are processed. Generally, nodes in the blockchain network process transactions serially in the order they are submitted. This can lead to low transaction throughput and delays between when a transaction is submitted and when it clears.

Techniques to address these transaction performance issues in a blockchain network would be advantageous.

SUMMARY

Implementations of this specification include computer-implemented methods for parallel execution of transaction in a blockchain network. More particularly, implementations of this specification are directed to executing groups of transactions having a shared dependency in parallel with other groups.

In some implementations, actions include identifying a plurality of transactions to be executed in the blockchain, wherein the transactions are arranged in an execution order, and wherein the execution order includes a contract call arranged after the plurality of transactions; identifying groups of transactions within the plurality of transactions, wherein each transaction in each group is associated with a same account in the blockchain network as the other transactions in the group; instructing nodes of the blockchain network to execute each of the groups of transactions in parallel, wherein executing each group of transactions includes executing the transactions within the group serially and according to the execution order; determining that the nodes of the blockchain network have completed executing all of the groups of transactions; and in response to determining that the nodes of the blockchain network have completed executing all of the groups of transactions, instructing the nodes of the blockchain network to execute the contract call. Other implementations include corresponding systems, apparatus, and computer programs, configured to perform the actions of the methods, encoded on computer storage devices.

These and other implementations may each optionally include one or more of the following features:

In some cases, instructing nodes of the blockchain network to execute each of the groups of transactions in parallel includes instructing a first set of nodes to execute a first group of transactions and instructing a first set of nodes to execute a second group of transactions.

In some implementations, determining that the nodes of the blockchain network have completed executing all of the groups of transactions includes determining that all transactions in the plurality of transactions have been included in one or more blocks stored in a blockchain maintained by the blockchain network.

In some implementations, the method includes determining that the nodes of the blockchain network have completed executing the contract call; identifying a second plurality of transactions to be executed in the blockchain, wherein the second plurality of transactions are arranged after the contract call in the execution order; identifying second groups of transactions within the second plurality of transactions; and instructing nodes of the blockchain network to execute each of the second groups of transactions in parallel, wherein executing each second group of transactions includes executing the transactions within the second group serially and according to the execution order.

In some cases, instructing nodes of the blockchain network to execute each of the groups of transactions in parallel includes sending a message to the nodes over a network.

In some cases, identifying the plurality of transactions to be executed in the blockchain includes receiving transactions broadcast to the blockchain network.

In some implementations, the contract call is a request to execute a smart contract stored in a blockchain maintained by the blockchain network.

This specification also provides one or more non-transitory computer-readable storage media coupled to one or more processors and having instructions stored thereon which, when executed by the one or more processors, cause the one or more processors to perform operations in accordance with implementations of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more implementations of this specification are set forth in the accompanying drawings and the description below. Other features and advantages of this specification will be apparent from the description and drawings, and from the claims.

DESCRIPTION OF DRAWINGS

Like reference symbols in the various drawings indicate like elements.

DETAILED DESCRIPTION

Implementations of this specification include computer-implemented methods for parallel execution of transaction in a blockchain network. More particularly, implementations of this specification are directed to executing groups of transactions having a shared dependency in parallel with other groups. In some implementations, actions include identifying a plurality of transactions to be executed in the blockchain, wherein the transactions are arranged in an execution order, and wherein the execution order includes a contract call arranged after the plurality of transactions; identifying groups of transactions within the plurality of transactions, wherein each transaction in each group is associated with a same account in the blockchain network as the other transactions in the group; instructing nodes of the blockchain network to execute each of the groups of transactions in parallel, wherein executing each group of transactions includes executing the transactions within the group serially and according to the execution order; determining that the nodes of the blockchain network have completed executing all of the groups of transactions; and in response to determining that the nodes of the blockchain network have completed executing all of the groups of transactions, instructing the nodes of the blockchain network to execute the contract call.

To provide further context for implementations of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. The term blockchain is used herein to generally refer to a DLS without reference to any particular use case.

A blockchain is a data structure that stores transactions in a way that the transactions are immutable, and can be subsequently verified. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a data structure for storing transactions, a blockchain network is a network of computing nodes that manage, update, and maintain one or more blockchains. As introduced above, a blockchain network can be provided as a public blockchain network, a private blockchain network, or a consortium blockchain network. In a public blockchain network, the consensus process is controlled by nodes of the consensus network. For example, hundreds, thousands, even millions of entities can cooperate a public blockchain network, each of which operates at least one node in the public blockchain network. Accordingly, the public blockchain network can be considered a public network with respect to the participating entities. In some examples, a majority of entities (nodes) must sign every block in order for the block to be valid, and added to the blockchain (distributed ledger) of the blockchain network. Example public blockchain networks include particular peer-to-peer payment networks that leverage a distributed ledger, referred to as blockchain. As noted above, the term blockchain, however, is used to generally refer to distributed ledgers without particular reference to any particular blockchain network.

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

Implementations of this specification can be realized in any appropriate type of blockchain network.

Implementations of this specification are described in further detail herein in view of the above context. More particularly, and as introduced above, implementations of this specification are directed to executing groups of transactions having a shared dependency in parallel with other groups. Because transactions in different groups have no dependency on one another (e.g., do not affect the same accounts in the blockchain network) the order in which transactions in different groups are executed relative to one another does not affect the overall state of the blockchain network. Thus, these transactions can be executed in parallel, which can lead to an increase in transaction throughput in a blockchain network.

Figure 1:
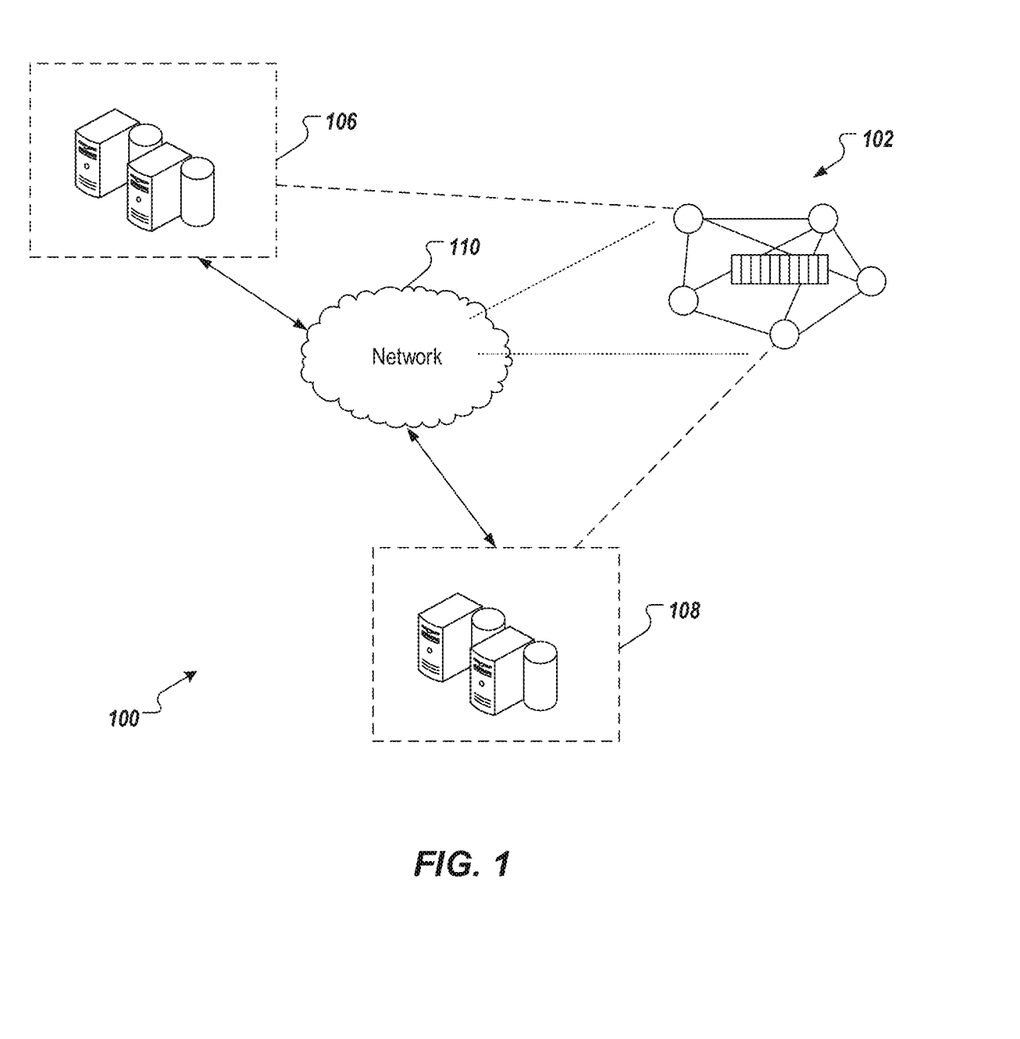
FIG. 1 depicts an example of an environment that can be used to execute implementations of this specification.

FIG. 1 depicts an example of an environment 100 that can be used to execute implementations of this specification. In some examples, the environment 100 enables entities to participate in a public blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the public blockchain network 102. In general the network 110 represents one or more communication networks. In some cases, the computing devices 106, 108 can be nodes of a cloud computing system (not shown), or can each computing device 106, 108 be a separate cloud computing system including a plurality of computers interconnected by a network and functioning as a distributed processing system.

In the depicted example, the computing systems 106, 108 can each include any appropriate computing system that enables participation as a node in the public blockchain network 102. Examples of computing devices include, without limitation, a server, a desktop computer, a laptop computer, a tablet computing device, and a smartphone. In some examples, the computing systems 106, 108 host one or more computer-implemented services for interacting with the public blockchain network 102. For example, the computing system 106 can host computer-implemented services of a first entity (e.g., Participant A), such as transaction management system that the first entity uses to manage its transactions with one or more other entities (e.g., other participants). The computing system 108 can host computer-implemented services of a second entity (e.g., Participant B), such as transaction management system that the second entity uses to manage its transactions with one or more other entities (e.g., other participants). In the example of FIG. 1, the public blockchain network 102 is represented as a peer-to-peer network of nodes, and the computing systems 106, 108 provide nodes of the first entity, and second entity respectively, which participate in the public blockchain network 102.

Figure 2:
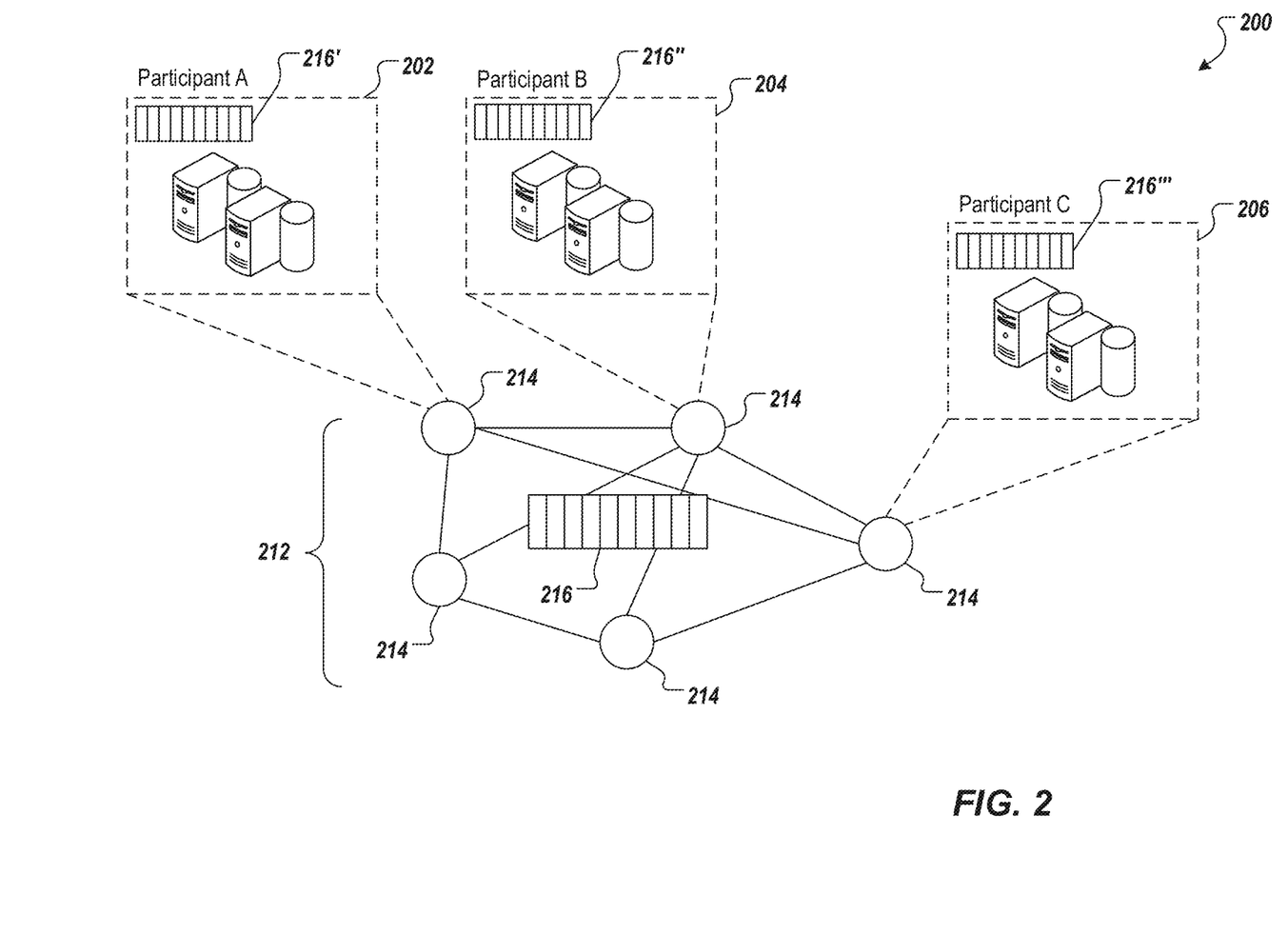
FIG. 2 depicts an example of a conceptual architecture in accordance with implementations of this specification.

FIG. 2 depicts an example of a conceptual architecture 200 in accordance with implementations of this specification. The example of a conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, 206 store respective, complete copies 216', 216", 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of transactions can include, without limitation, exchanges of something of value (e.g., assets, products, services). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An examples of hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and compete to have a block added to the blockchain. Such nodes are referred to as miners (or minder nodes). POW, introduced above, is used as a non-limiting example.

The miner nodes execute the consensus process to add transactions to the blockchain. Although multiple miner nodes participate in the consensus process, only one miner node can write the block to the blockchain. That is, the miner nodes compete in the consensus process to have their block added to the blockchain. In further detail, a miner node periodically collects pending transactions from a transaction pool (e.g., up to a predefined limit on the number of transactions that can be included in a block, if any). The transaction pool includes transaction messages from participants in the blockchain network. The miner node constructs a block, and adds the transactions to the block. Before adding the transactions to the block, the miner node checks whether any of the transactions are already included in a block of the blockchain. If a transaction is already included in another block, the transaction is discarded.

The miner node generates a block header, hashes all of the transactions in the block, and combines the hash value in pairs to generate further hash values until a single hash value is provided for all transactions in the block (the Merkle root hash). This hash is added to the block header. The miner also determines the hash value of the most recent block in the blockchain (i.e., the last block added to the blockchain). The miner node also adds a nonce value, and a timestamp to the block header. In a mining process, the miner node attempts to find a hash value that meets required parameters. The miner node keeps changing the nonce value until finding a hash value that meets the required parameters.

Every miner in the blockchain network attempts to find a hash value that meets the required parameters, and, in this way, compete with one another. Eventually, one of the miner nodes finds a hash value that meets the required parameters, and advertises this to all other miner nodes in the blockchain network. The other miner nodes verify the hash value, and if determined to be correct, verifies each transaction in the block, accepts the block, and appends the block to their copy of the blockchain. In this manner, a global state of the blockchain is consistent across all miner nodes within the blockchain network. The above-described process is the POW consensus protocol.

A non-limiting example is provided with reference to FIG. 2. In this example, Participant A wants to send an amount to Participant B. Participant A generates a transaction message (e.g., including From, To, and Value fields), and sends the transaction message to the blockchain network, which adds the transaction message to a transaction pool. Each miner node in the blockchain network creates a block, and takes all transactions from the transaction pool (e.g., up to a predefined limit on the number of transaction that can be added to a block, if any), and adds the transactions to the block. In this manner the transaction published by Participant A is added to the blocks of the miner nodes.

In some blockchain networks, cryptography is implemented to maintain privacy of transactions. For example, if two nodes want to keep a transaction private, such that other nodes in the blockchain network cannot discern details of the transaction, the nodes can encrypt the transaction data. Examples of cryptographic methods include, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3A:
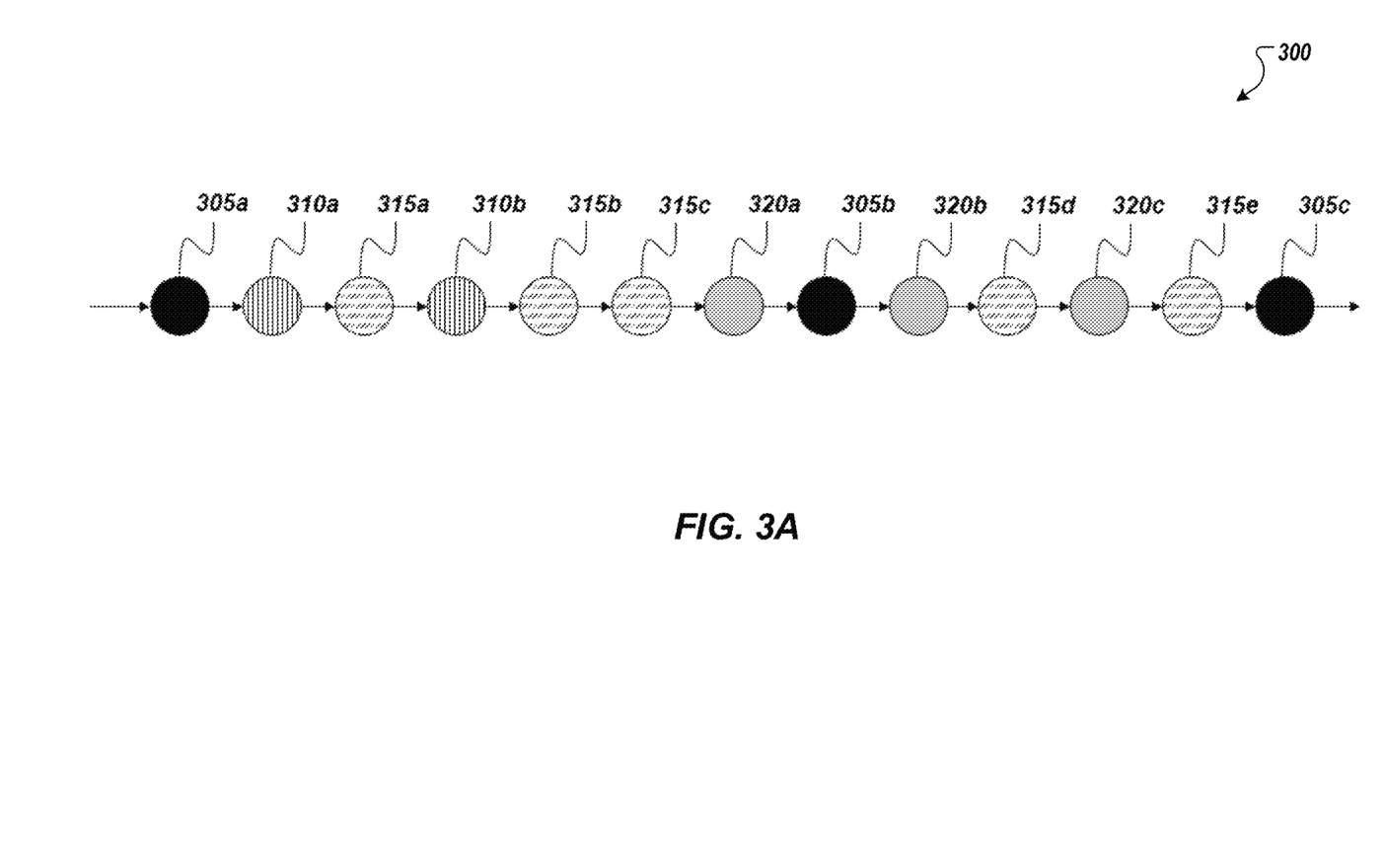
FIG. 3A depicts an example of an execution order for transactions in a blockchain network in accordance with implementations of this specification.

To provide further context for implementations of this specification, FIG. 3A depicts an example of an execution order 300 for transactions in a blockchain network in accordance with implementations of this specification. As shown, the execution order 300 includes a plurality of transactions (305, 310, 315, 320) sequenced according to the order in which they are to be executed by nodes of a blockchain network. Transaction 305a, 305b, and 305c are calls to smart contracts. In addition the smart contract calls, the execution order 300 includes multiple groups of transactions sharing a common dependency (denoted by cross hatching), such as, for example, affecting the same account. Transactions 310a, 310b represent a first group, transactions 315a-e represent a second group, and 320a-c represent a third group. As described below, each group of transactions can be executed in parallel by the nodes of the blockchain network according to implementations of this specification.

Figure 3B:
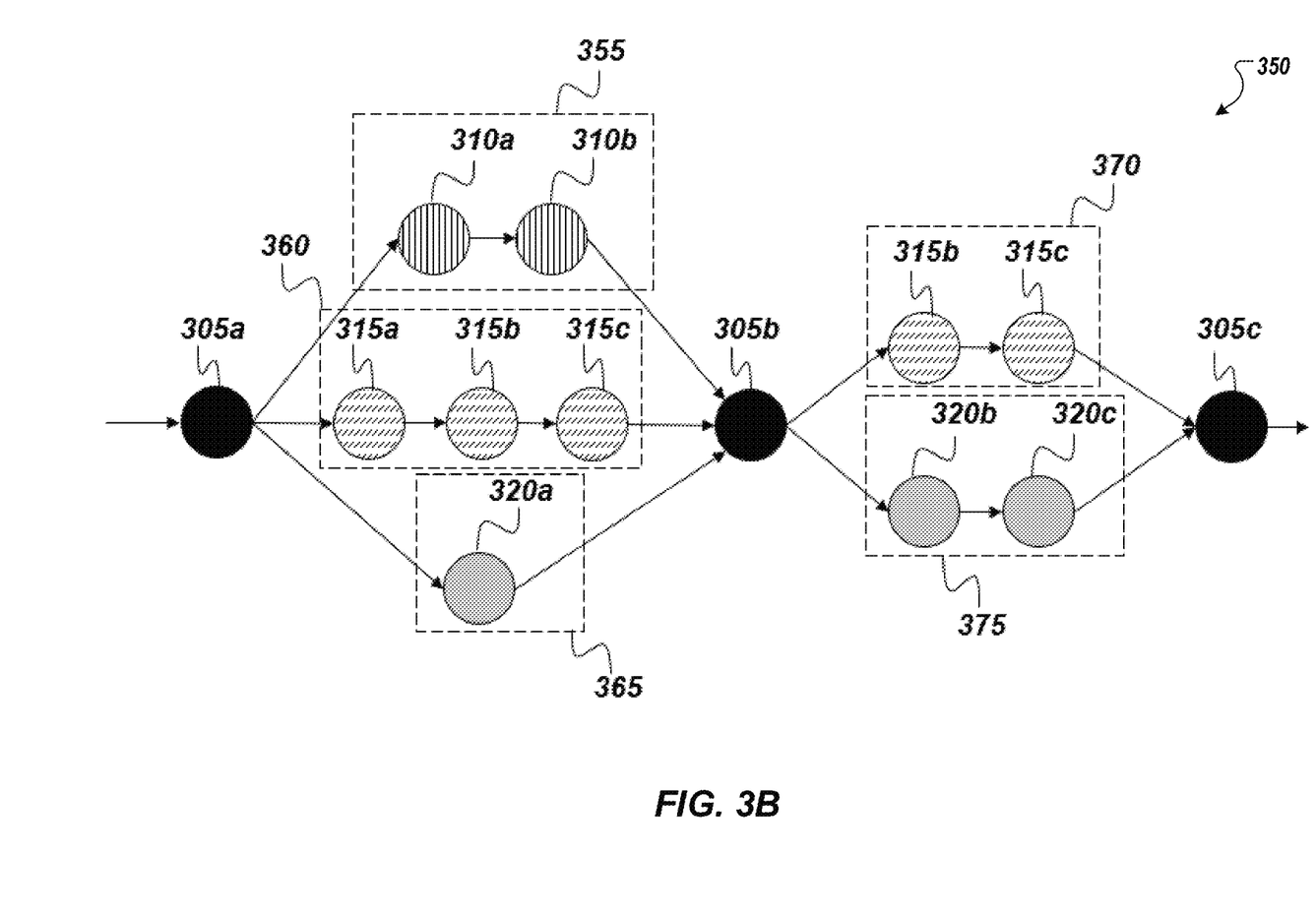
FIG. 3B depicts an example of a parallel execution order for transactions in a blockchain network in accordance with implementations of this specification.

FIG. 3B depicts an example of a parallel execution order 350 for transactions in a blockchain network in accordance with implementations of this specification. As shown, in the parallel execution order 350, groups of transactions 355, 360, 365, 370, and 375 have been identified. Nodes of a blockchain network can execute the groups of transactions in parallel, as shown in the FIG. 3B and discussed. In some cases, all transactions in a group share a common dependency, and therefore are executed serially according to the original execution order. This ensures that the state of the blockchain network (e.g., the account balances) will be the same as a result of executing the transactions according to the parallel execution order 350 as it would be after executing the transactions according to the execution order 300 in FIG. 3A.

Consider the example where account A has a balance of $0 before executing any of the transactions in FIG. 3B, where transaction 310a represents a payment to account A from account B in the amount of $300, and transaction 310b represents a payment from account A to account C of $50. If the transactions 310a and 310b are executed serially (as originally described in the execution order 300), account A will first be funded with $300, and then debited by $50, leaving a balance of $250. However, if the transactions 310a and 310b are not executed serially, and transaction 310b is executed before 310a, the account A will have a balance of $0 when the payment of transaction 310b is executed. Account A will have an insufficient balance to fund the payment in this scenario, which could lead to transaction 310b being rejected by the blockchain network.

Building on this example, consider a case where transaction 320a represents a payment from an account D to an account E of $100. Because the accounts affected by transaction 320a (accounts D and E) do not include any of the accounts affected by transactions 310a and 310b (accounts A, B, and C), transaction 320a has no common dependency with transactions 310a and 310b. Thus, transaction 320a can be executed in parallel with transactions 310a and 310b.

In some implementations, transactions to be executed serially can be grouped together. For example, as shown in the FIG. 3B, transactions 310a-b are grouped in 355, transactions 315a, 315b, and 315c are grouped in 360, and transaction 320a is grouped in 365. Each of the groups 355, 360 and 365 can be executed in parallel by the nodes of the blockchain network. Executing the transaction groups 355, 360, and 365 in parallel can lead to an increase in transaction throughput on the blockchain network, as the network is now executing three transactions at any one time in parallel rather than just one if all transactions were executed serially.

FIG. 3B also includes contract calls 305a-c. Contract calls represent a synchronization point, where parallel execution converges. Because contract calls lead to the execution of the instructions making up the smart contract, it may not be possible to determine the scope of accounts a particular contract call will affect. For example, consider a simple smart contract that takes a particular account and a payment amount as parameters, and applies the payment amount to the particular account if some condition is true. Because a caller of this smart contract specifies the particular account when the smart contract is called, it is not possible to determine, from the definition of the smart contract itself (i.e., its source code) which accounts a particular call to the smart contract will affect. For this reason, in some implementations, the contract call can be seen as a transaction with the potential to affect all accounts in the blockchain network, which therefore cannot be executed in parallel with other transactions. Thus, the parallel execution order 350 converges when it reaches a contract call. For example, as shown, groups 355, 360, and 365 execute in parallel until reaching contract call 305b. At this point, the blockchain network waits until all transactions in the groups 355, 360, and 365 have completed execution, and then proceeds with execution of the smart contract call 305b.

After contract call 305b is completed, groups of transactions (e.g., 370 and 375) can again be executed in parallel by the blockchain network until another smart contract call (e.g., 305c) is encountered, at which point the parallel execution again converges prior to execution of the smart contract call.

Figure 4:
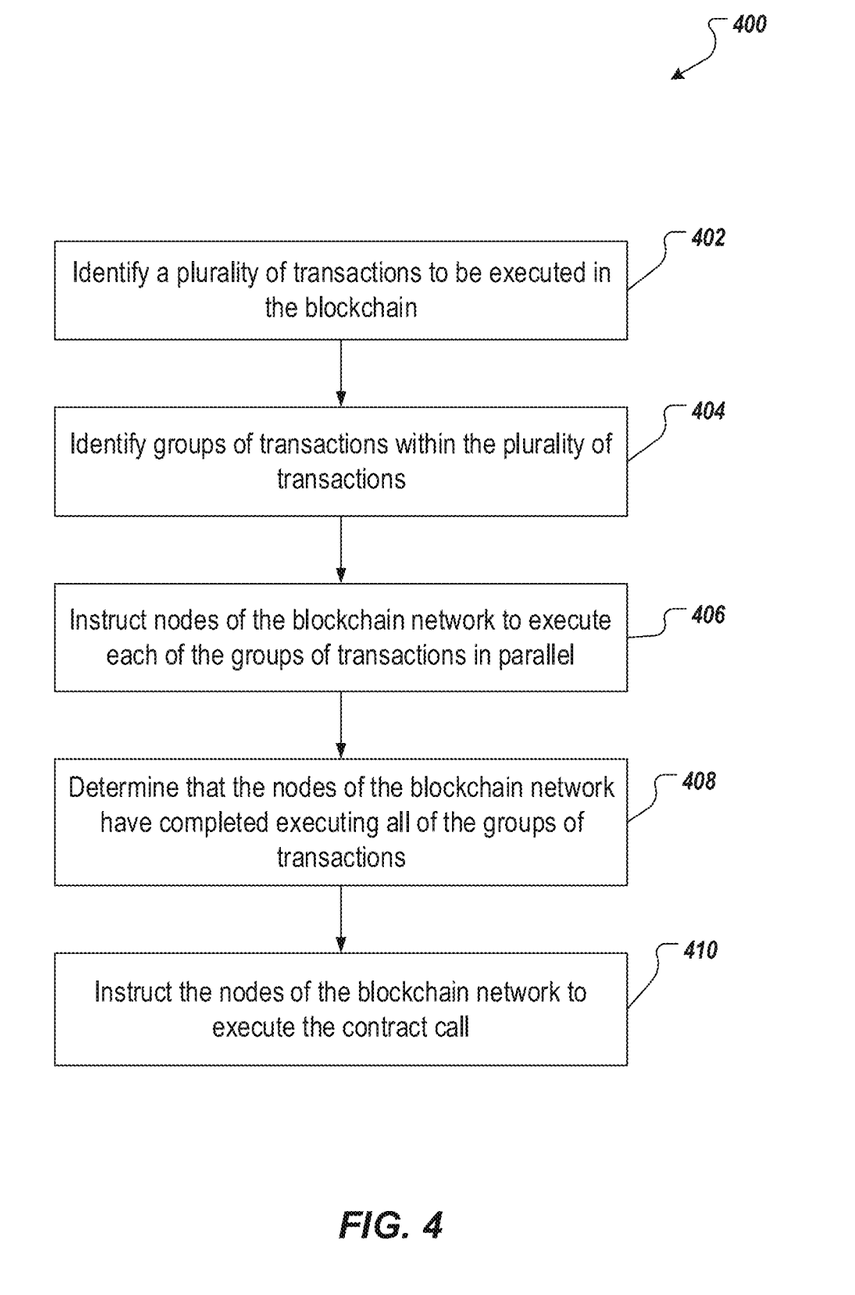
FIG. 4 depicts an example of a process that can be executed in accordance with implementations of this specification.

FIG. 4 depicts an example of a process 400 that can be executed in accordance with implementations of this specification. In some implementations, the process 400 may be performed using one or more computer-executable programs executed using one or more computing devices.

At 402, a plurality of transactions to be executed in the blockchain are identified. The transactions are arranged in an execution order, and the execution order includes a contract call arranged after the plurality of transactions. In some cases, identifying the plurality of transactions to be executed in the blockchain includes receiving transactions broadcast to the blockchain network. In some implementations, the contract call is a request to execute a smart contract stored in a blockchain maintained by the blockchain network.

At 404, groups of transactions are identified within the plurality of transactions, wherein each transaction in each group is associated with a same account in the blockchain network as the other transactions in the group.

At 406, nodes of the blockchain network are instructed to execute each of the groups of transactions in parallel, wherein executing each group of transactions includes executing the transactions within the group serially and according to the execution order. In some cases, instructing nodes of the blockchain network to execute each of the groups of transactions in parallel includes instructing a first set of nodes to execute a first group of transactions and instructing a first set of nodes to execute a second group of transactions. In some implementations, instructing nodes of the blockchain network to execute each of the groups of transactions in parallel includes sending a message to the nodes over a network.

At 408, a determination is made that the nodes of the blockchain network have completed executing all of the groups of transactions. In some implementations, determining that the nodes of the blockchain network have completed executing all of the groups of transactions includes determining that all transactions in the plurality of transactions have been included in one or more blocks stored in a blockchain maintained by the blockchain network.

At 410, in response to determining that the nodes of the blockchain network have completed executing all of the groups of transactions, the nodes of the blockchain network are instructed to execute the contract call.

In some implementations, the process 400 includes determining that the nodes of the blockchain network have completed executing the contract call; identifying a second plurality of transactions to be executed in the blockchain, wherein the second plurality of transactions are arranged after the contract call in the execution order; identifying second groups of transactions within the second plurality of transactions; and instructing nodes of the blockchain network to execute each of the second groups of transactions in parallel, wherein executing each second group of transactions includes executing the transactions within the second group serially and according to the execution order.

Figure 5:
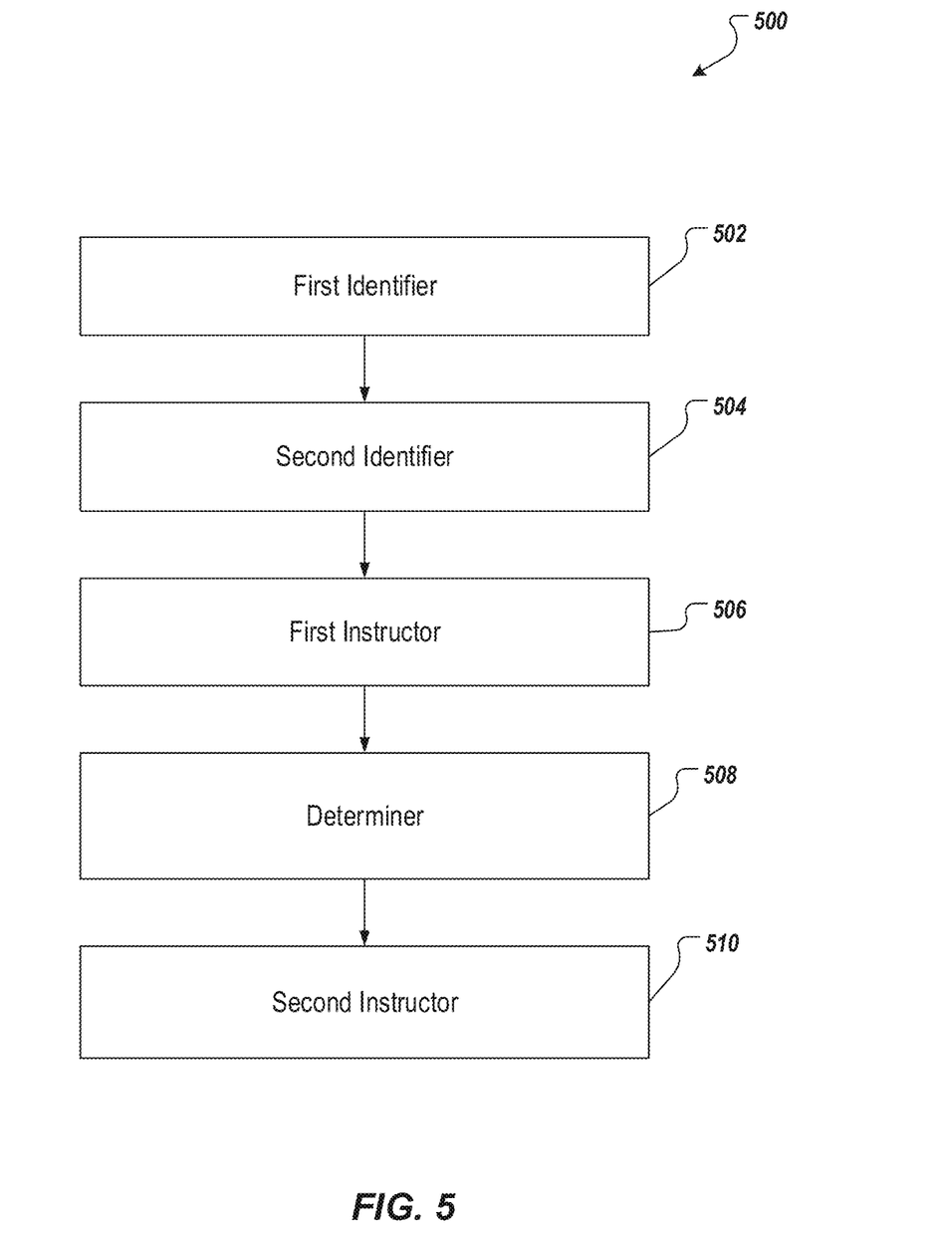
FIG. 5 depicts examples of modules of an apparatus in accordance with implementations of this specification.

FIG. 5 depicts examples of modules of an apparatus 500 in accordance with implementations of this specification. The apparatus 500 can be an example implementation of an apparatus configured to enable parallel execution of transactions in a blockchain network, such as a consortium blockchain network. The apparatus 500 can correspond to the implementations described above, and the apparatus 500 includes the following: a first identifier or first identifying unit 502 for identifying a plurality of transactions to be executed in the blockchain, wherein the transactions are arranged in an execution order, and wherein the execution order includes a contract call arranged after the plurality of transactions; a second identifier or second identifying unit 504 for identifying groups of transactions within the plurality of transactions, wherein each transaction in each group is associated with a same account in the blockchain network as the other transactions in the group; a first instructor or first instructing unit 506 for instructing nodes of the blockchain network to execute each of the groups of transactions in parallel, wherein executing each group of transactions includes executing the transactions within the group serially and according to the execution order; a determiner or determining unit 508 for determining that the nodes of the blockchain network have completed executing all of the groups of transactions; and a second instructor or second instructing unit 510 for instructing the nodes of the blockchain network to execute the contract call in response to determining that the nodes of the blockchain network have completed executing all of the groups of transactions.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a number of network units. Some or all of the modules can be selected based on actual demands to achieve the objectives of the solutions of the specification. A person of ordinary skill in the art can understand and implement the implementations of the present application without creative efforts.

Referring again to FIG. 5, it can be interpreted as illustrating an internal functional module and a structure of an apparatus for enabling parallel execution of transactions in a blockchain network. The parallel execution apparatus can be an example of an apparatus configured to enable parallel execution of transactions in a blockchain network.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will be coupled to at least one non-transitory computer-readable storage medium (also referred to as a computer-readable memory). The storage medium coupled to the computer can be an internal component of the computer (e.g., an integrated hard drive) or an external component (e.g., universal serial bus (USB) hard drive or a storage system accessed over a network). Examples of storage media can include, for example, magnetic, magneto-optical, or optical disks, solid state drives, network storage resources such as cloud storage systems, or other types of storage media. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for parallel execution of transactions in a blockchain network, the method comprising:

identifying, by one or more processors, a first plurality of transactions to be executed in the blockchain network, wherein the transactions are arranged in an execution order, and wherein the execution order comprises a dependency on a first contract call to be executed after the first plurality of transactions are executed, wherein the first contract call comprises a conditional transaction with a potential to affect a plurality of accounts in the blockchain network by application of a payment amount to one or more of the plurality of accounts in the blockchain network according to a condition;

determining, by the one or more processors, first groups of transactions within the first plurality of transactions, wherein each transaction of a respective first group is associated with a same account in the blockchain network as other transactions in the respective first group, wherein all transactions in the respective first group share a common dependency, and wherein the respective first group is one of the first groups of transactions;

instructing, by the one or more processors, nodes of the blockchain network to execute the first groups of transactions in parallel with no dependency between the first groups of transactions, wherein instructing the nodes of the blockchain network to execute each of the first groups of transactions in parallel comprises sending a message to the nodes over a network, and wherein executing the first groups of transactions comprises executing the transactions within a first group serially and according to the execution order;

determining, by the one or more processors, that the nodes of the blockchain network have completed executing all of the first groups of transactions; and in response to determining that the nodes of the blockchain network have completed executing all of the first groups of transactions, instructing, by the one or more processors, the nodes of the blockchain network to execute the first contract call;

determining, by the one or more processors, that the nodes of the blockchain network have completed executing the first contract call;

identifying, by the one or more processors, a second plurality of transactions to be executed in the blockchain network, wherein the second plurality of transactions are arranged after the first contract call in the execution order;

identifying, by the one or more processors, second groups of transactions within the second plurality of transactions; and instructing, by the one or more processors, the nodes of the blockchain network to execute each of the second groups of transactions in parallel, wherein instructing the nodes of the blockchain network to execute each of the second groups of transactions in parallel comprises sending a message to the nodes over the network, and wherein executing each second group of transactions comprises executing the transactions within a second group serially and according to the execution order.

2. The computer-implemented method of claim 1, wherein instructing nodes of the blockchain network to execute each of a groups of transactions in parallel comprises instructing a first set of nodes to execute a first group of transactions and instructing a second set of nodes to execute a second group of transactions.

3. The computer-implemented method of claim 1, wherein determining that the nodes of the blockchain network have completed executing all of groups of transactions comprises determining that all transactions in a plurality of transactions have been included in one or more blocks maintained by the blockchain network.

4. The computer-implemented method of claim 1, wherein identifying a plurality of transactions to be executed in the blockchain network comprises receiving transactions broadcast to the blockchain network.

5. The computer-implemented method of claim 1, wherein a contract call is a request to execute a smart contract maintained by the blockchain network.

6. A non-transitory, computer-readable medium storing one or more instructions executable by a computer system to perform operations for parallel execution of transactions in a blockchain network, the operations comprising:
identifying a first plurality of transactions to be executed in the blockchain network, wherein the transactions are arranged in an execution order, and wherein the execution order comprises a dependency on a first contract call to be executed after the first plurality of transactions are executed, wherein the first contract call comprises a conditional transaction with a potential to affect a plurality of accounts in the blockchain network by application of a payment amount to one or more of the plurality of accounts in the blockchain network-according to a condition;
determining first groups of transactions within the first plurality of transactions, wherein each transaction of a respective first group is associated with a same account in the blockchain network as other transactions in the respective first group, wherein all transactions in the respective first group share a common dependency, and wherein the respective first group is one of the first groups of transactions;
instructing nodes of the blockchain network to execute the first groups of transactions in parallel with no dependency between the first groups of transactions, wherein instructing the nodes of the blockchain network to execute each of the first groups of transactions in parallel comprises sending a message to the nodes over a network, and wherein executing the first groups of transactions comprises executing the transactions within a first group serially and according to the execution order;
determining that the nodes of the blockchain network have completed executing all of the first groups of transactions; and
in response to determining that the nodes of the blockchain network have completed executing all of the first groups of transactions, instructing the nodes of the blockchain network to execute the first contract call;
determining that the nodes of the blockchain network have completed executing the first contract call;
identifying a second plurality of transactions to be executed in the blockchain network, wherein the second plurality of transactions are arranged after the first contract call in the execution order;
identifying second groups of transactions within the second plurality of transactions; and
instructing the nodes of the blockchain network to execute each of the second groups of transactions in parallel, wherein instructing the nodes of the blockchain network to execute each of the second groups of transactions in parallel comprises sending a message to the nodes over the network, and wherein executing each second group of transactions comprises executing the transactions within a second group serially and according to the execution order.

7. The non-transitory, computer-readable medium of claim 6, wherein instructing nodes of the blockchain network to execute each of a groups of transactions in parallel comprises instructing a first set of nodes to execute a first group of transactions and instructing a second set of nodes to execute a second group of transactions.

8. The non-transitory, computer-readable medium of claim 6, wherein determining that the nodes of the blockchain network have completed executing all of a groups of transactions comprises determining that all transactions in a plurality of transactions have been included in one or more blocks maintained by the blockchain network.

9. The non-transitory, computer-readable medium of claim 6, wherein identifying a plurality of transactions to be executed in the blockchain network comprises receiving transactions broadcast to the blockchain network.

10. The non-transitory, computer-readable medium of claim 6, wherein a contract call is a request to execute a smart contract maintained by the blockchain network.

11. A system for parallel execution of transactions in a blockchain network, the system comprising:
one or more computers; and
one or more computer memory devices interoperably coupled with the one or more computers and having tangible, non-transitory, machine-readable media storing one or more instructions that, when executed by the one or more computers, perform one or more operations comprising:
identifying a first plurality of transactions to be executed in the blockchain network, wherein the transactions are arranged in an execution order, and wherein the execution order comprises a dependency on a first contract call to be executed after the first plurality of transactions are executed, wherein the first contract call comprises a conditional transaction with a potential to affect a plurality of accounts in the blockchain network by application of a payment amount to one or more of the plurality of accounts in the blockchain network according to a condition;
determining first groups of transactions within the first plurality of transactions, wherein each transaction of a respective first group is associated with a same account in the blockchain network as other transactions in the respective first group, wherein all transactions in the respective first group share a common dependency, and wherein the respective first group is one of the first groups of transactions;
instructing nodes of the blockchain network to execute the first groups of transactions in parallel with no dependency between the first groups of transactions, wherein instructing the nodes of the blockchain network to execute each of the first groups of transactions in parallel comprises sending a message to the nodes over a network, and wherein executing the first groups of transactions comprises executing the transactions within a first group serially and according to the execution order;
determining that the nodes of the blockchain network have completed executing all of the first groups of transactions; and
in response to determining that the nodes of the blockchain network have completed executing all of the first groups of transactions, instructing the nodes of the blockchain network to execute the first contract call;
determining that the nodes of the blockchain network have completed executing the first contract call;
identifying a second plurality of transactions to be executed in the blockchain network, wherein the second plurality of transactions are arranged after the first contract call in the execution order;

identifying second groups of transactions within the second plurality of transactions; and instructing the nodes of the blockchain network to execute each of the second groups of transactions in parallel, wherein instructing the nodes of the blockchain network to execute each of the second groups of transactions in parallel comprises sending a message to the nodes over the network, and wherein executing each second group of transactions comprises executing the transactions within a second group serially and according to the execution order.

12. The system of claim 11, wherein instructing nodes of the blockchain network to execute each of a groups of transactions in parallel comprises instructing a first set of nodes to execute a first group of transactions and instructing a second set of nodes to execute a second group of transactions.

13. The system of claim 11, wherein determining that the nodes of the blockchain network have completed executing all of a groups of transactions comprises determining that all transactions in a plurality of transactions have been included in one or more blocks maintained by the blockchain network.

14. The system of claim 11, wherein identifying a plurality of transactions to be executed in the blockchain network comprises receiving transactions broadcast to the blockchain network.

* * * * *